(12) United States Patent
Tomizawa et al.

(10) Patent No.: US 12,147,130 B2
(45) Date of Patent: Nov. 19, 2024

(54) DISPLAY DEVICE

(71) Applicant: Japan Display Inc., Tokyo (JP)

(72) Inventors: Kazunari Tomizawa, Tokyo (JP); Tsutomu Harada, Tokyo (JP); Junji Kobashi, Tokyo (JP); Shinichiro Oka, Tokyo (JP); Yosuke Hyodo, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 37 days.

(21) Appl. No.: 17/972,904

(22) Filed: Oct. 25, 2022

(65) Prior Publication Data
US 2023/0039923 A1 Feb. 9, 2023

Related U.S. Application Data

(63) Continuation of application No. PCT/JP2021/015707, filed on Apr. 16, 2021.

(30) Foreign Application Priority Data

Apr. 28, 2020 (JP) ................. 2020-079399

(51) Int. Cl.
*G02F 1/1347* (2006.01)
*G02F 1/1335* (2006.01)

(52) U.S. Cl.
CPC ...... *G02F 1/1347* (2013.01); *G02F 1/133531* (2021.01); *G02F 1/133514* (2013.01); *G02F 2203/48* (2013.01)

(58) Field of Classification Search
CPC ............. G02F 1/1347; G02F 1/133531; G02F 1/133514; G02F 2203/48; G02B 5/30
See application file for complete search history.

(56) References Cited

U.S. PATENT DOCUMENTS

| | | | |
|---|---|---|---|
| 2007/0177071 A1* | 8/2007 | Egi | G02F 1/133533 349/96 |
| 2009/0147186 A1 | 6/2009 | Nakai et al. | |
| 2018/0321553 A1* | 11/2018 | Robinson | G02B 6/0076 |
| 2019/0137817 A1 | 5/2019 | Yasui et al. | |
| 2021/0208427 A1* | 7/2021 | Lee | G02B 5/3025 |
| 2022/0187657 A1* | 6/2022 | Weindorf | G02F 1/133601 |

FOREIGN PATENT DOCUMENTS

| | | |
|---|---|---|
| JP | 4878032 B2 | 2/2012 |
| JP | 2019-86719 A | 6/2019 |
| WO | 2007/040127 A1 | 4/2007 |

OTHER PUBLICATIONS

International Search Report and Written Opinion mailed on Jun. 29, 2021, received for PCT Application PCT/JP2021/015707, filed on Apr. 16, 2021, 8 pages including English Translation.

* cited by examiner

*Primary Examiner* — Jonathan Y Jung
(74) *Attorney, Agent, or Firm* — XSENSUS LLP

(57) ABSTRACT

According to one embodiment, in a display device a first panel includes a first polarizing plate, a second polarizing plate, and a first liquid crystal panel interposed between the first polarizing plate and the second polarizing plate, a second panel includes a third polarizing plate, a fourth polarizing plate, and a second liquid crystal panel interposed between the third polarizing plate and the fourth polarizing plat, and a polarizing plate, which is located second from a surface close to an illumination device and a surface closest to an observer, has an extinction ratio that is lower than that of each of the other polarizing plates.

4 Claims, 14 Drawing Sheets

FIG. 1B

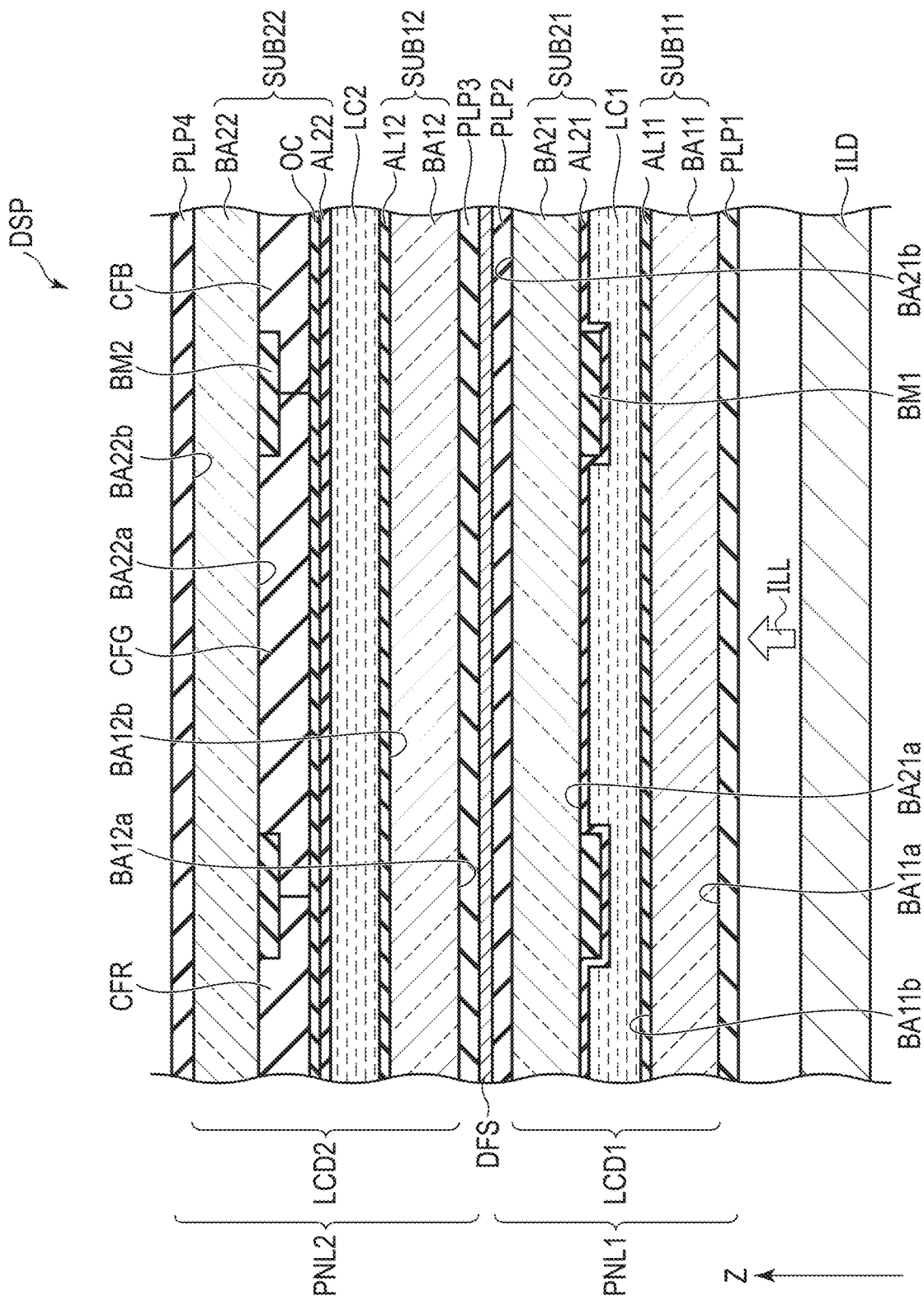
F I G. 2

| | | Transmittance | Extinction ratio | Degree of de-polarization | Dimming panel PNL1 on state | | | Dimming panel PNL1 off state | | | Contrast |
|---|---|---|---|---|---|---|---|---|---|---|---|
| | | | | | POL1(%) | POL2(%) | POL1+POL2(%) | POL1(%) | POL2(%) | POL1+POL2(%) | |
| | Illumination device ILD | | | | 50 | 50 | 100 | 50 | 50 | 100 | |
| Dimming panel PNL1 | Polarizing plate PLP1 | 87% | 4.5 | 0 | 43.5 | 0.00 | 43.5 | 43.5 | 0.0014 | 43.5 | |
| | Liquid crystal panel LCD1 | 52% | | 0.10% | 0.02 | 22.6 | 22.61 | 22.6 | 0.0224 | 22.61 | |
| | Polarizing plate PLP2 | 87% | 4.5 | 0 | 0.00 | 19.65 | 19.65 | 0.0006 | 0.0195 | 0.0201 | |
| | Diffusion sheet DFS | 86% | | 0 | 0.00 | 16.9 | 16.9 | 0.0005 | 0.0168 | 0.0173 | |
| | Polarizing plate PLP3 | 87% | 4.5 | 0 | 0.00 | 14.7 | 14.7 | 0.0000 | 0.0146 | 0.0146 | |
| Display panel PNL2 | Liquid crystal panel LCD2 | 32% | | 0.10% | 4.7 | 0.00 | 4.71 | 0.000004 | 0.004666 | 0.00467 | |
| | Polarizing plate PLP4 | 87% | 4.5 | 0 | 4.09 | 0.00 | 4.09 | 0.000004 | 0.000000 | 0.000004 | |
| | | | | | | Trans-mittance | 4.09 | | Trans-mittance | 0.000004 | 1,014,049 |

F I G. 4

| | | Trans-mittance | Ex-tinction ratio | Degree of de-polarization | Dimming panel PNL1 on state | | | Dimming panel PNL1 off state | | | Contrast |
|---|---|---|---|---|---|---|---|---|---|---|---|
| | | | | | POL1(%) | POL2(%) | POL1+POL2(%) | POL1(%) | POL2(%) | POL1+POL2(%) | 989,839 |
| | Illumination device ILD | | | | 50 | 50 | 100 | 50 | 50 | 100 | |
| Dimming panel PNL1 | Polarizing plate PLP1 | 87% | 4.5 | 0 | 43.5 | 0.0014 | 43.5 | 43.5 | 0.0014 | 43.5 | |
| | Liquid crystal panel LCD1 | 52% | | 0.10% | 0.02 | 22.6 | 22.61 | 22.6 | 0.0224 | 22.61 | |
| | Polarizing plate PLP2 | 96% | 3.1 | 0 | 0.00 | 21.69 | 21.69 | 0.0172 | 0.0215 | 0.0387 | |
| | Diffusion sheet DFS | 86% | | 0 | 0.00 | 18.65 | 18.65 | 0.0148 | 0.0185 | 0.0333 | |
| | Polarizing plate PLP3 | 87% | 4.5 | 0 | 0.00 | 16.22 | 16.22 | 0.0000 | 0.0161 | 0.0161 | |
| Display panel PNL2 | Liquid crystal panel LCD2 | 32% | | 0.10% | 5.19 | 0.00 | 5.19 | 0.000005 | 0.005148 | 0.005153 | |
| | Polarizing plate PLP4 | 87% | 4.5 | 0 | 4.51 | 0.00 | 4.51 | 0.000004 | 0.000000 | 0.000005 | |
| | | | | | Trans-mittance | | 4.51 | Trans-mittance | | 0.000005 | |

F I G. 6

| | | Trans-mittance | Ex-tinction ratio | Degree of de-polarization | Dimming panel PNL1 on state | | | Dimming panel PNL1 off state | | | Contrast |
|---|---|---|---|---|---|---|---|---|---|---|---|
| | | | | | POL1(%) | POL2(%) | POL1+POL2(%) | POL1(%) | POL2(%) | POL1+POL2(%) | |
| | Illumination device ILD | | | | 50 | 50 | 100 | 50 | 50 | 100 | 989,839 |
| Dimming panel PNL1 | Polarizing plate PLP1 | 87% | 4.5 | 0 | 43.5 | 0.0014 | 43.5 | 43.5 | 0.0014 | 43.5 | |
| | Liquid crystal panel LCD1 | 52% | | 0.10% | 0.02 | 22.6 | 22.61 | 22.6 | 0.0224 | 22.61 | |
| | Polarizing plate PLP2 | 87% | 4.5 | 0 | 0.00 | 19.65 | 19.65 | 0.0006 | 0.0195 | 0.0201 | |
| | Diffusion sheet DFS | 86% | | 0 | 0.00 | 16.9 | 16.9 | 0.0005 | 0.0168 | 0.0173 | |
| | Polarizing plate PLP3 | 96% | 3.1 | 0 | 0.00 | 16.22 | 16.22 | 0.0000 | 0.0161 | 0.0161 | |
| Display panel PNL2 | Liquid crystal panel LCD2 | 32% | | 0.10% | 5.19 | 0.00 | 5.19 | 0.000005 | 0.005148 | 0.005153 | |
| | Polarizing plate PLP4 | 87% | 4.5 | 0 | 4.51 | 0.00 | 4.51 | 0.000004 | 0.000000 | 0.000005 | |
| | | | | | | Trans-mittance | 4.51 | | Trans-mittance | 0.000005 | |

F I G. 9

| | | Transmittance | Extinction ratio | Degree of depolarization | Dimming panel PNL1 on state | | | Dimming panel PNL1 off state | | | Contrast |
|---|---|---|---|---|---|---|---|---|---|---|---|
| | | | | | POL1(%) | POL2(%) | POL1+POL2(%) | POL1(%) | POL2(%) | POL1+POL2(%) | 573,669 |
| | Illumination device ILD | 96% | | | 50 | 50 | 100 | 50 | 50 | 100 | |
| Dimming panel PNL1 | Polarizing plate PLP1 | 52% | 3.1 | 0 | 48.0 | 0.04 | 48.04 | 48.0 | 0.0381 | 48.04 | |
| | Liquid crystal panel LCD1 | 87% | | 0.10% | 0.04 | 24.9 | 24.97 | 24.9 | 0.0438 | 24.97 | |
| | Polarizing plate PLP2 | 86% | 4.5 | 0 | 0.00 | 21.69 | 21.69 | 0.0007 | 0.0381 | 0.0387 | |
| | Diffusion sheet DFS | 87% | | 0 | 0.00 | 18.65 | 18.65 | 0.0006 | 0.0327 | 0.0333 | |
| | Polarizing plate PLP3 | 87% | 4.5 | 0 | 0.00 | 16.22 | 16.22 | 0.0000 | 0.0285 | 0.0285 | |
| Display panel PNL2 | Liquid crystal panel LCD2 | 32% | | 0.10% | 5.19 | 0.00 | 5.19 | 0.000009 | 0.009104 | 0.009113 | |
| | Polarizing plate PLP4 | 87% | 4.5 | 0 | 4.51 | 0.00 | 4.51 | 0.000008 | 0.000000 | 0.000008 | |
| | | | | | | Transmittance | 4.51 | | Transmittance | 0.000008 | |

FIG. 11

| | | Trans-mittance | Ex-tinction ratio | Degree of de-polarization | Dimming panel PNL1 on state | | | Dimming panel PNL1 off state | | | Contrast |
|---|---|---|---|---|---|---|---|---|---|---|---|
| | | | | | POL1(%) | POL2(%) | POL1+POL2(%) | POL1(%) | POL2(%) | POL1+POL2(%) | |
| | Illumination device ILD | | | | 50 | 50 | 100 | 50 | 50 | 100 | |
| Dimming panel PNL1 | Polarizing plate PLP1 | 87% | 4.5 | 0 | 43.5 | 0 | 43.5 | 43.5 | 0.0014 | 43.5 | |
| | Liquid crystal panel LCD1 | 52% | | 0.10% | 0.02 | 22.6 | 22.61 | 22.6 | 0.0224 | 22.61 | |
| | Polarizing plate PLP2 | 87% | 4.5 | 0 | 0.00 | 19.65 | 19.65 | 0.0006 | 0.0195 | 0.0201 | |
| | Diffusion sheet DFS | 86% | | 0 | 0.00 | 16.9 | 16.9 | 0.0005 | 0.0168 | 0.0173 | |
| | Polarizing plate PLP3 | 87% | 4.5 | 0 | 0.00 | 14.7 | 14.7 | 0.0000 | 0.0146 | 0.0146 | |
| Display panel PNL2 | Liquid crystal panel LCD2 | 32% | | 0.10% | 4.70 | 0.00 | 4.71 | 0.000004 | 0.004666 | 0.00467 | |
| | Polarizing plate PLP4 | 96% | 3.1 | 0 | 4.51 | 0.00 | 4.51 | 0.000004 | 0.000004 | 0.000008 | |
| | | | | | | Trans-mittance | 4.51 | | Trans-mittance | 0.000008 | 573,669 |

FIG. 13

DISPLAY DEVICE

CROSS-REFERENCE TO RELATED APPLICATIONS

This application is a Continuation Application of PCT Application No. PCT/JP2021/015707, filed Apr. 16, 2021, and based upon and claiming the benefit of priority from Japanese Patent Application No. 2020-079399, filed Apr. 28, 2020, the entire contents of all of which are incorporated herein by reference.

FIELD

Embodiments described herein relate generally to a display device.

BACKGROUND

Technologies to improve contrast of a display device.

BRIEF DESCRIPTION OF THE DRAWINGS

FIG. 2 is a schematic sectional view showing a configuration of the display device DSP shown in FIG. 1A.

FIG. 4 is a table showing transmittance of each component and polarizer extinction ratio of each component of the display device, and a degree of depolarization of liquid crystal panels in the display device.

FIG. 6 is a table showing transmittance of each component and polarizer extinction ratio of each component of the display device, and a degree of depolarization of liquid crystal panels in the display device.

FIG. 9 is a table showing transmittance of each component and polarizer extinction ratio of each component of the display device, and a degree of depolarization of liquid crystal panels in the display device.

FIG. 11 is a table showing transmittance of each component and polarizer extinction ratio of each component of the display device, and a degree of depolarization of liquid crystal panels in the display device.

FIG. 13 is a table showing transmittance of each component and polarizer extinction ratio of each component of the display device, and a degree of depolarization of liquid crystal panels in the display device.

DETAILED DESCRIPTION

Figure 1A:
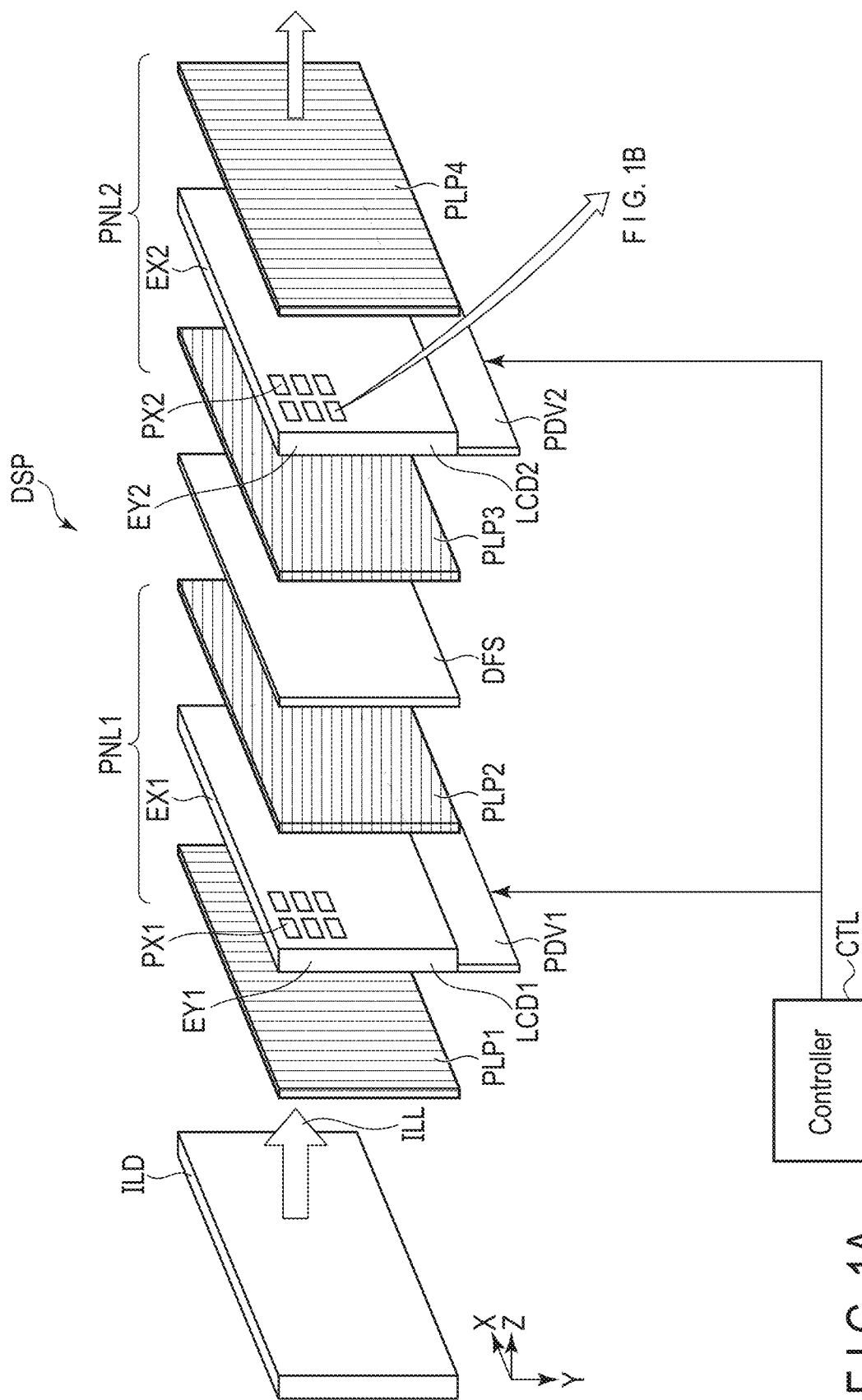
FIG. 1A is a schematic view showing a configuration of a display device.

In general, according to one embodiment, a display device comprises an illumination device, a first panel, and a second panel, which are stacked in sequence, wherein: the first panel includes a first polarizing plate, a second polarizing plate, and a first liquid crystal panel interposed between the first polarizing plate and the second polarizing plate, the second panel includes a third polarizing plate, a fourth polarizing plate, and a second liquid crystal panel interposed between the third polarizing plate and the fourth polarizing plat, and among the first polarizing plate to the fourth polarizing plate, a polarizing plate, which is located second from a surface close to the illumination device and a surface closest to an observer, has an extinction ratio that is lower than that of each of the other polarizing plates.

According to another one embodiment, a display device comprises an illumination device, a first panel, and a second panel, which are stacked in sequence, wherein: the first panel includes a first polarizing plate, a second polarizing plate, and a first liquid crystal panel interposed between the first polarizing plate and the second polarizing plate, which are located in sequence from the illumination device; the second panel includes a third polarizing plate, a fourth polarizing plate, and a second liquid crystal panel interposed between the third polarizing plate and the fourth polarizing plate, which are located in sequence from the first panel, and the second polarizing plate has an extinction ratio that is lower than that of each of the first polarizing plate, the third polarizing plate and the fourth polarizing plate, or the third polarizing plate has an extinction ratio that is lower than that of each of the first polarizing plate, the second polarizing plate and the fourth polarizing plate.

Embodiments described herein aim to provide a display device that is improved in its display quality.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

A display device according to an embodiment will now be described in detail with reference to accompanying drawings.

In this embodiment, a first direction X, a second direction Y and a third direction Z are orthogonal to each other, but they may intersect at an angle other than 90 degrees. In the following descriptions, a direction forwarding a tip of an arrow indicating the third direction Z is referred to as upward or downward and a direction forwarding oppositely from the tip of the arrow is referred to as downward or upward.

With such expressions "a second member above a first member" and "a second member below a first member", the second member may be in contact with the first member or may be remote from the first member. In the latter case, a third member may be interposed between the first member and the second member. On the other hand, with such expressions "a second member on a first member" and "a second member on a first member", the second member is meant to be in contact with the first member.

In addition, it is assumed that there is an observation position to observe the semiconductor substrate on a tip side of an arrow in a third direction Z, and viewing from this observation position toward the X-Y plane defined by the first direction X and the second direction Y is referred to as a planar view. Viewing a cross section of the semiconductor substrate in an X-Z plane defined by the first direction X and the third direction Z or a Y-Z plane defined by the second direction Y and the third direction Z is referred to as a cross-sectional view.

Embodiment

Figure 1B:
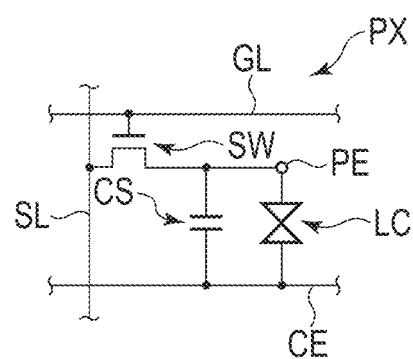
FIG. 1B is a schematic diagram showing a configuration of the display device.

FIGS. 1A and 1B each schematically show a configuration of a display device DSP. FIG. 1A schematically shows the overall configuration of the display device DSP. The display device DSP shown in FIG. 1A includes a dimming panel PNL1, a display panel PNL2, an illumination device ILD, a diffusion sheet DFS and a controller CTL. As shown in FIG. 1A, the dimming panel PNL1 is interposed between the display panel PNL2 and the illumination device ILD. Thus, the contrast of images displayed on the display panel PNL2 can be improved.

The controller CTL outputs a control signal to control the dimming panel PNL1 and the display panel PNL2. The control signal is input to pixels PX1 provided in the dimming panel PNL1 via a panel driver PDV1 provided in the dimming panel PNL1. Similarly, the control signal is input to pixels PX2 provided in the display panel PNL2 via a panel driver PDV2 provided in the display panel PNL2. Note that an interface may be interposed between the controller CTL and each of the panel drivers PDV1 and PDV2.

The illumination device ILD is located below the dimming panel PNL1 to emit illumination light ILL toward the dimming panel PNL1. The illumination device ILD includes a plurality of light source elements. The illumination device ILD may be a direct illumination device or a sidelight illumination device. The pixels PX2 control the illumination light ILL, which is emitted from the illumination device ILD, to display an image.

The illumination light ILL emitted from the illumination device ILD contains first polarized light POL1 and second polarized light POL2. The first polarized light POL1 and second polarized light POL2 are linearly polarized light whose vibration surfaces are orthogonal to each other. In the illumination light ILL, the ratio of the first polarized light POL1 and the second polarized light POL2 is 50 to 50, that is, the amounts thereof are the same.

The dimming panel PNL1 includes a polarizing plate PLP1, a polarizing plate PLP2 and a liquid crystal panel LCD1 interposed between the polarizing plates PLP1 and PLP2. The liquid crystal panel LCD1 is rectangular in one example. In the example shown in FIG. 1A, the long side EX1 of the liquid crystal panel LCD1 is parallel to a first direction X, and the short side EY1 of the liquid crystal panel LCD1 is parallel to a second direction Y. A third direction Z corresponds to the thickness direction of the liquid crystal panel LCD 1. The main surface of the liquid crystal panel LCD1 is parallel to an X-Y plane defined by the first and second directions X and Y.

The liquid crystal panel LCD1 is provided with the foregoing panel driver PDV1. In FIG. 1A, the panel driver PDV1 extends along the long side EX1 of the liquid crystal panel LCD1, but it may extend along the short side EY1 of the liquid crystal panel. The panel driver PDV1 may be placed independently of the liquid crystal panel PNL1 and so configured that a signal is input to the liquid crystal panel PNL1 from outside the liquid crystal panel PNL1.

The liquid crystal panel LCD1 includes a plurality of pixels PX1 arranged in a matrix. The configuration of the pixels PX1 is the same as that of the pixels PX2, which will be described in detail later. If the pixels PX1 and PX2 need not be distinguished in particular, they will be referred to simply as pixels PX.

The diffusion sheet DFS is provided between the dimming panel PNL1 and the display panel PNL2. The diffusion sheet DFS can suppress moire that is generated by superposing the dimming panel PNL1 and the display panel PNL2 on each other. The diffusion sheet DFS may be fixed between the dimming panel PNL1 and the display panel PNL2, more specifically, between the polarizing plate PLP2 of the dimming panel PNL1 and the polarizing plate PLP3 of the display panel PNL2 with an adhesive such as an optical clear adhesive (OCA).

The display panel PNL2 will be described. The display panel PNL2 includes a polarizing plate PLP3, a polarizing plate PLP4, and a liquid crystal panel LCD2 interposed between the polarizing plates PLP3 and PLP4. Like the liquid crystal panel LCD1, the liquid crystal panel LCD2 is rectangular in one example. In the example shown in FIG. 1A, the long side EX2 of the liquid crystal panel LCD2 is parallel to the first direction X, and the short side EY2 of the liquid crystal panel LCD2 is parallel to the second direction Y. The third direction Z corresponds to the thickness direction of the liquid crystal panel LCD2. The main surface of the liquid crystal panel LCD2 is parallel to the X-Y plane defined by the first and second directions X and Y.

The liquid crystal panel LCD2 is provided with the foregoing panel driver PDV2. In FIG. 1A, the panel driver PDV2 extends along the long side EX2 of the liquid crystal panel LCD2, but it may extend along the short side EY2 of the liquid crystal panel. The panel driver PDV2 may be placed independently of the liquid crystal panel PN2 and may be so configured that a signal is input to the liquid crystal panel PNL2 from outside the liquid crystal panel PNL2.

The liquid crystal panel LCD2 includes a plurality of pixels PX2 arranged in a matrix. FIG. 1B is a circuit diagram showing a pixel PX2 (pixel PX). As shown in FIG. 1B, the pixel PX2 (represented as PX in FIG. 1B) is placed in an area partitioned by a scanning line GL and a signal line SL, and includes a switching element SW, a pixel electrode PE, a common electrode CE, a liquid crystal layer LC, and the like. Note that the pixel PX1 of the liquid crystal panel LCD 1 has a configuration similar to that of the pixel PX2.

The switching element SW is configured by, for example, a thin film transistor (TFT) and is electrically connected to the scanning line GL and the signal line SL. The scanning line GL is electrically connected to the switching element SW in each of the pixels PX2 arranged in the first direction X. The signal line SL is electrically connected to the switching element SW in each of the pixels PX2 arranged in the second direction Y. The pixel electrode PE is electrically connected to the switching element SW. Each pixel electrode PE is opposed to the common electrode CE to generate an electric field therebetween, and the electric field drives a liquid crystal layer LC2. Capacitance CS is formed, for example, between an electrode having the same potential as the common electrode CE and an electrode having the same potential as the pixel electrode PE.

As described above, the pixel PX1 has a configuration similar to that of the pixel PX2.

FIG. 2 is a sectional view schematically showing a configuration of the display device DSP shown in FIG. 1A.

As described above, the display device DSP includes an illumination device ILD, a dimming panel PNL1, a diffusion sheet DFS and a display panel PNL2, which are stacked in this order along the third direction Z. In other words, the display device DSP includes an illumination device ILD, a display panel PNL2, and a dimming panel PNL1 interposed between the illumination device ILD and the display panel PNL2. The diffusion sheet DFS is interposed between the dimming panel PNL1 and the display panel PNL2.

In the present embodiment, the dimming panel PNL1 and the display panel PNL2 are also referred to as a first panel and a second panel, respectively. The liquid crystal panel LCD1 and the liquid crystal panel LCD2 are also referred to as a first liquid crystal panel and a second liquid crystal panel, respectively. Furthermore, the polarizing plate PLP1, the polarizing plate PLP2, the polarizing plate PLP3 and the polarizing plate PLP4 are also referred to as a first polarizing plate, a second polarizing plate, a third polarizing plate and a fourth polarizing plate, respectively.

First is a description of a sectional configuration of the dimming panel PNL1.

As shown in FIG. 2, the dimming panel PNL1 includes a polarizing plate PLP1, a liquid crystal panel LCD1 and a polarizing plate PLP2, which are stacked in this order along the third direction Z. The liquid crystal panel LCD1 is configured to include a substrate SUB11, a liquid crystal layer LC1 and a substrate SUB 12, which are stacked in this order.

The liquid crystal layer LC1 is interposed between the substrates SUB11 and SUB21 and sealed by a seal (not shown). The polarizing axes of the polarizing plates PLP1 and PLP2 cross each other, for example, in a cross-Nicol relationship, that is, at an angle of 90 degrees. The polarizing axis of the polarizing plate PLP3 of the display panel PNL2 is parallel to that of the polarizing plate PLP2 of the dimming panel PNL1, which will be described in detail later.

As shown in FIG. 2, the substrate SUB11 includes a base BA11 and an alignment film AL11. In addition to the foregoing configuration, the substrate SUB11 includes a scanning line GL, a signal line SL, a switching element SW, a pixel electrode PE, a common electrode CE and the like, like the display panel PNL2 to be described later, but these elements are not shown in FIG. 2.

The base BA11 has a main surface (lower surface) BA11*a* and a main surface (upper surface) BA11*b* that is the opposite side of the main surface BA11*a*. The main surface BA11*b* of the base BA11 is provided with a scanning line GL, a signal line SL, a switching element SW, a pixel electrode PE, a common electrode CE and the like, none of which is shown. The main surface BA11*b* of the base BA11 is also provided with an alignment film AL11 that is in contact with the liquid crystal layer LC1. The polarizing plate PLP1 adheres to the main surface BA11*a* of the base BA11.

As shown in FIG. 2, the substrate SUB2*l* includes a base BA21, a light-shielding film BM1 and an alignment film AL21. Since the dimming panel PNL1 is intended to control brightness and need not form a color image, the substrate SUB21 of the dimming panel PNL1 is not provided with a color filter CF.

The dimming panel PNL1 differs from the display panel PNL2 in that it is not provided with an overcoat film OC, which will be described in detail later. The reason why the dimming panel PNL1 is not provided with an overcoat film OC is as follows. Since the dimming panel PNL1 is not provided with a color filter CF as described above and since the light-shielding film BM1 is formed of not a black resin but an untransparent metal material (see below), it is unnecessary to prevent pigment (resin) from seeping into the liquid crystal layer LC1.

The base BA21 has a main surface (lower surface) BA21*a* and a main surface (upper surface) BA21*b* that is the opposite side of the main surface BA21*a*. The main surface BA21*a* of the base BA21 is opposed to the main surface BA11*b* of the base BA11. The light-shielding film BM1 is provided on the main surface BA21*a* of the base BA21 to partition the pixels PX1 like the scanning line GL and the signal line SL. Note that the light-shielding film BM1 is preferably formed of an untransparent metal material such as molybdenum (Mo), aluminum (Al), tungsten (W), titanium (Ti) and silver (Ag). The alignment film AL21 covers the light-shielding film BM1 and is in contact with the liquid crystal layer LC1. The polarizing plate PLP2 adheres to the main surface BA21*b* of the base BA21.

The bases BA11 and BA21 are transparent insulating substrates such as a glass substrate and a plastic substrate. The alignment films AL11 and AL21 are horizontal alignment films which are substantially parallel to the X-Y plane and have alignment restriction force. The alignment restriction force may be applied by rubbing treatment or photoalignment treatment.

Next is a description of a configuration of the display panel PNL2.

As shown in FIG. 2, the display panel PNL2 includes a polarizing plate PLP3, a liquid crystal panel LCD2 and a polarizing plate PLP4, which are stacked in this order along the third direction Z. The liquid crystal panel LCD2 is configured to include a substrate SUB12, a liquid crystal layer LC2 and a substrate SUB 22, which are stacked in this order.

The liquid crystal layer LC2 is interposed between the substrates SUB12 and SUB22 and sealed by a seal (not shown). The polarizing axes of the polarizing plates PLP3 and PLP4 cross each other, for example, in a cross-Nicol relationship, that is, at an angle of 90 degrees.

As shown in FIG. 2, the substrate SUB12 includes a base BA12 and an alignment film AL12. The substrate SUB12 includes a scanning line GL, a signal line SL, a switching element SW, a pixel electrode PE, a common electrode CE and the like, shown in, for example, FIG. 1B, in addition to the foregoing configuration, but these elements are not shown in FIG. 2.

The base BA12 has a main surface (lower surface) BA12*a* and a main surface (upper surface) BA12*b* that is the opposite side of the main surface BA12*a*. The main surface BA12*b* of the base BA12 is provided with a scanning line GL, a signal line SL, a switching element SW, a pixel electrode PE, a common electrode CE and the like (not shown). The main surface BA12*b* of the base BA12 is also provided with an alignment film AL12 that is in contact with the liquid crystal layer LC2. The polarizing plate PLP3 adheres to the main surface BA12*a* of the base BA12.

As shown in FIG. 2, the substrate SUB22 includes a base BA22, a light-shielding film BM2, a color filter CF, an overcoat film OC and an alignment film AL22.

The base BA22 has a main surface (lower surface) BA22*a* and a main surface (upper surface) BA22*b* that is the opposite side of the main surface BA22*a*. The main surface BA22*a* of the base BA22 is opposed to the main surface BA12*b* of the base BA12. The light-shielding film BM2 is provided on the main surface BA22*a* of the base BA22 to partition the pixels PX2 like the scanning line GL and the signal line SL. Part of the color filter CF is superposed on the light-shielding film BM2. The color filter CF includes a red color filter CFR, a green color filter CFG, a blue color filter CFB, and the like. The overcoat film OC covers the color filter CF. The overcoat film OC can prevent pigment constituting the color filter CF from seeping into the liquid crystal layer LC2. The alignment film AL22 covers the overcoat film OC and is in contact with the liquid crystal layer LC 2. The polarizing plate PLP4 adheres to the main surface BA22b of the base BA22.

The bases BA12 and BA22 are transparent insulating substrates such as a glass substrate and a plastic substrate. The light-shielding film BM2 is preferably formed of a black resin in which black pigments and the like are dispersed. The alignment films AL12 and AL22 are horizontal alignment films which are substantially parallel to the X-Y plane and have alignment restriction force. The alignment restriction force may be applied by rubbing treatment or photoalignment treatment.

The diffusion sheet DFS is interposed between the dimming panel PNL1 and the display panel PNL2 as described above. The diffusion sheet DFS may simply be interposed between the polarizing plate PLP2 of the dimming panel PNL1 and the polarizing plate PLP3 of the display panel PNL2, or may be fixed with an adhesive such as an OCA.

The illumination device ILD is located below the dimming panel PNL1. As the illumination device ILD, a variety of types of backlight unit can be used, and for example, a light emitting diode (LED) can be used as a light source. Although not shown in FIG. 2, a cover member or the like may be further placed on the polarizing plate PLP4 of the display panel PNL2.

The display device DSP shown in FIGS. 1A, 1B and 2 includes an illumination device ILD, a polarizing plate PLP1, a liquid crystal panel LCD1, a dimming panel PNL1 having a polarizing plate PLP2, a polarizing plate PLP3, a liquid crystal panel LCD2, and a display panel PNL2 having a polarizing plate PLP4, as described above. When illumination light emitted from the illumination device ILD is transmitted through the dimming panel PNL1 and the display panel PNL2, its luminance decreases. This is caused by, for example, absorption and reflection of light in the interior of each component. Details thereof will be described below.

Figure 3:
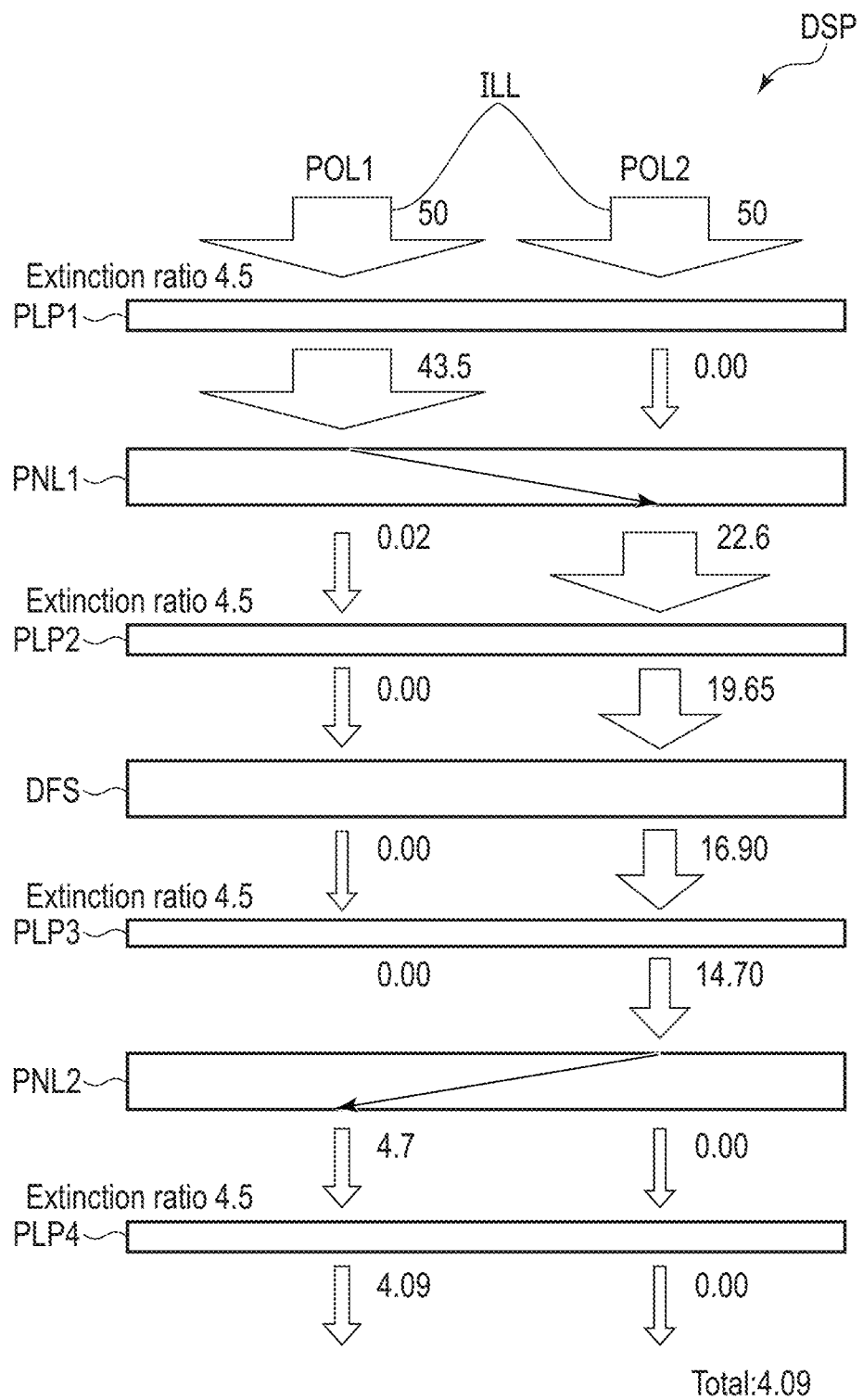
FIG. 3 is a schematic diagram showing a luminance transition and the like in the display device.

FIG. 3 is a schematic diagram showing a luminance transition and the like in the display device DSP. FIG. 4 is a table showing transmittance of each component, extinction ratio of the polarizing plate (polarizing plates PLP1, PLP2, PLP3, PLP4), and a degree of depolarization of the liquid crystal panels LCD1 and LCD2.

Note that extinction ratio Re is expressed by Re=$\log_{10}$ (T1/T0), where T1 is transmittance in the transmission direction and T0 is transmittance in a direction perpendicular to the transmittance direction. Assume in FIGS. 3 and 4 that the extinction ratios of the polarizing plates PLP1, PLP2, PLP3 and PLP4 are P1, P2, P3 and P4, respectively. Assume that in FIGS. 3 and 4 that the extinction ratios P1, P2, P3 and P4 have the same value and the value is 4.5 (P1=P2=P3=P4=4.5).

The degree of depolarization corresponds to a degree at which polarization is lost. When light incident upon the liquid crystal panels LCD1 and LCD2 is reflected by wiring, resin and the like contained in the liquid crystal panels, the polarization plane is rotated and the polarization is lost. When the polarization is lost, for example, part of the first polarization POL1 changes to the second polarization POL2.

In FIG. 3, only the polarizing plate PLP1, liquid crystal panel LCD1, polarizing plate PLP2, diffusion sheet DFS, polarizing plate PLP3, liquid crystal panel LCD2 and polarizing plate PLP4 of the display device are shown, and the other components are excluded. As described above, the polarizing plate PLP1, liquid crystal panel LCD1 and polarizing plate PLP2 constitute the dimming panel PNL1, and the polarizing plate PLP3, liquid crystal panel LCD2 and polarizing plate PLP4 constitute the display panel PNL2.

FIG. 3 also shows a luminance transition in the case where the dimming panel PNL1 is in an ON state. Assume first that illumination light ILL emitted from the illumination device ILD contains 50% of the first polarized light POL1 and 50% of the second polarized light POL2. Symbol "%" is excluded from FIG. 3 in order to simplify the figure.

First, the illumination light ILL first is transmitted through the polarizing plate PLP1. As shown in FIG. 4, the transmittance of the polarizing plate PLP1 is 87%. The polarizing axis of the polarizing plate PLP1 is parallel to that of the first polarized light POL1. Thus, the percentage of the first polarized light POL1 transmitted through the polarizing plate PLP1 is 43.5% and that of the second polarized light POL2 transmitted through the polarizing plate PLP1 is 0.00%.

Then, the light transmitted through the polarizing plate PLP1 is transmitted through the liquid crystal panel LCD1. The transmittance of the liquid crystal panel LCD1 is 52% and the degree of depolarization is 0.10%. Thus, the percentage of the first polarized light POL1 transmitted through the liquid crystal panel LCD1 is 0.02% and that of the second polarized light POL2 transmitted through the liquid crystal panel LCD1 is 22.6%.

As described above, the liquid crystal panel LCD1 is in an ON state. The light transmitted through the liquid crystal panel LCD 1 enters the polarizing plate PLP2. The transmittance of the polarizing plate PLP2 is 87%. Since the polarizing axes of the polarizing plates PLP2 and PLP1 are in a cross-Nicol relationship, the percentage of the first polarized light POL1 transmitted through the polarizing plate PLP2 is 0.00% and that of the second polarized light POL2 transmitted through the polarizing plate PLP2 is 19.65%.

Then, the light transmitted through the polarizing plate PLP2, that is, the light transmitted through the dimming panel PNL1, is transmitted through the diffusion sheet DFS. Since the transmittance of the diffusion sheet DFS is 86%, the percentage of the first polarized light POL1 is 0.00% and that of the second polarized light POL2 is 16.90%.

The light transmitted through the diffusion sheet DFS enters the display panel PNL2. The transmittance of the polarizing plate PLP3 of the display panel PNL2 is 87%. The polarizing axes of the polarizing plates PLP3 and PLP2 are parallel to each other. Thus, the percentage of the first polarized light POL1 transmitted through the polarizing plate PLP3 is 0.00% and that of the second polarized light POL2 transmitted through the polarizing plate PLP3 is 14.70%.

The transmittance of the liquid crystal panel LCD2 of the display panel PNL2 is 32% as shown in FIG. 4. The degree of depolarization of the liquid crystal panel LCD2 is 0.10%. Therefore, the percentage of the first polarized light POL1 transmitted through the liquid crystal panel LCD2 is 4.70% and that of the second polarized light POL2 transmitted through the liquid crystal panel LCD2 is 0.00%.

The light transmitted through the liquid crystal panel LCD2 enters the polarizing plate PLP4. The transmittance of the polarizing plate PLP4 is 87%. Since the polarizing axes of the polarizing plates PLP4 and PLP3 are in a cross-Nicol relationship, the percentage of the first polarized light POL1 transmitted through the polarizing plate PLP4 is 4.09% and that of the second polarized light POL2 transmitted through the polarizing plate PLP4 is 0.00%. The luminance of the display device DSP is the sum of the first polarized light POL1 and the second polarized light POL2, that is, 4.09%.

It can be derived from the above that the transmittance of the display device DSP is 4.09%.

If the transmittance is calculated in the same manner when the dimming panel PNL1 is in an OFF state, it is 0.000004%.

Since the contrast ratio of the display device DSP is the ratio of the transmittance in the ON state to the transmittance in the OFF state, it is 4.09:0.000004:1=1,014,049:1. The display device DSP shown in FIGS. 3 and 4 can thus display a high-contrast image.

Contrary to the above, the transmittance is as low as 4.09%, which may darken an image to be displayed. Human eyes are more sensitive to low transmittance (dark images) than high contrast. It is thus likely that low transmittance will lower display quality.

In view of the above, in the present embodiment, in order to increase the transmittance of the display device DSP, the extinction ratio of the second one of the four polarizing plates PLP from outside of the display device DSP is decreased. For example, the configuration of FIG. 2 decreases the extinction ratio of the polarizing plate PLP2 or PLP3. It is thus possible to obtain a display device DSP that increases the transmittance to display a bright image while maintaining high contrast to some extent. The details thereof will be described below.

Figure 5:
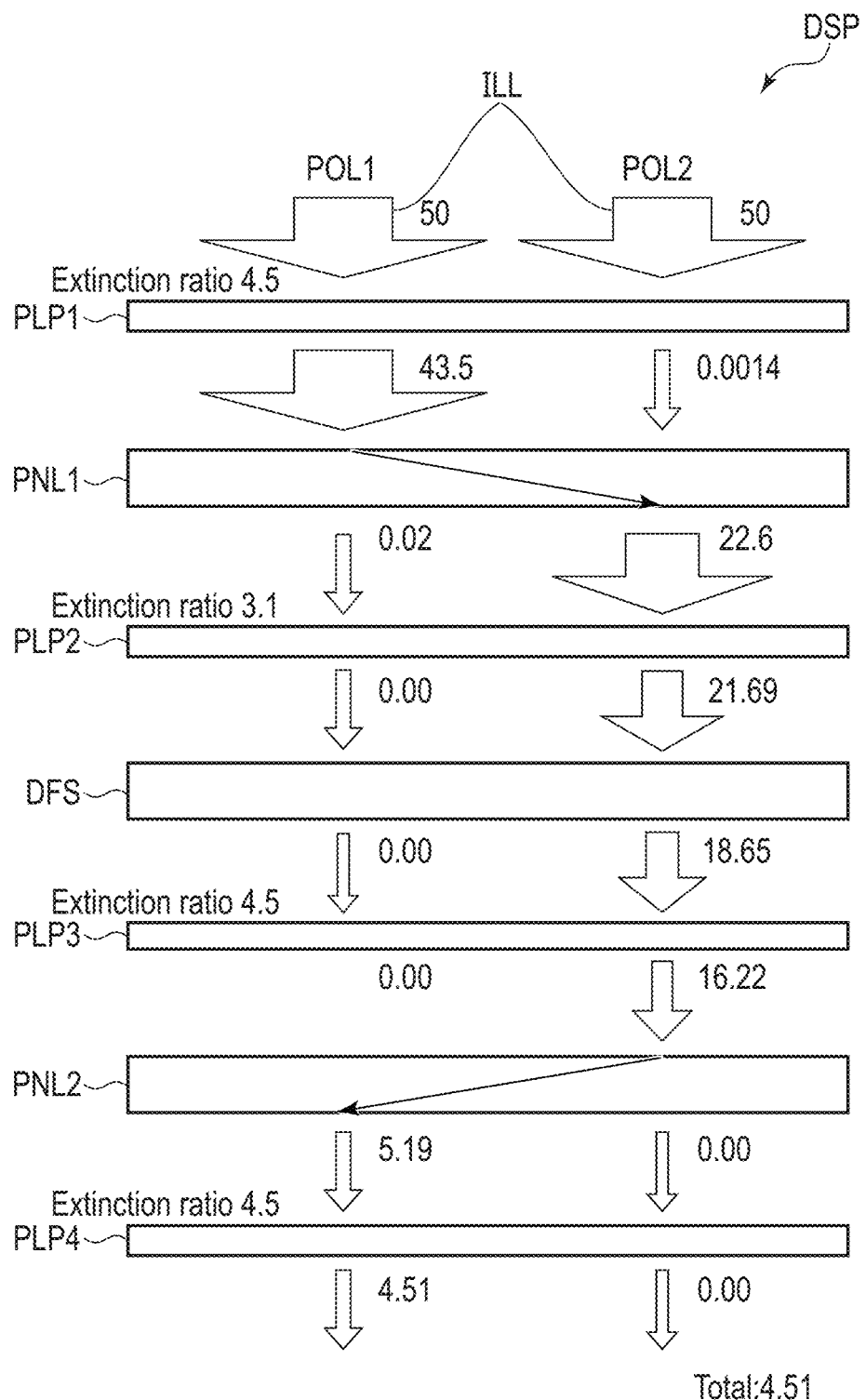
FIG. 5 is a schematic diagram showing a luminance transition and the like in the display device.

FIG. 5 is a schematic diagram showing a luminance transition and the like in the display device DSP. FIG. 5 shows a luminance transition when the dimming panel PNL1 of the display device DSP is in an ON state. FIG. 6 is a table showing transmittance of each component, extinction ratio of the polarizing plate (polarizing plates PLP1, PLP2, PLP3, PLP4), and a degree of depolarization of the liquid crystal panels LCD1 and LCD2.

In FIGS. 5 and 6, among the extinction ratios P1, P2, P3 and P4 of the polarizing plates PLP1, PLP2, PLP3 and PLP4, the extinction ratio P2 of the second one PLP2 of the polarizing plates from outside is made lower than that of each of the other polarizing plates, as compared with FIGS. 3 and 4. That is, the extinction ratio P2 of the polarizing plate PLP2 is determined so that the relation "P2<P1, P3, P4" holds.

The outside or outermost polarizing plate of the display device DSP refers to the polarizing plate PLP1 of the dimming panel PNL1 and the polarizing plate PLP4 of the display panel PNL2. That is, the outside or outermost polarizing plate is a polarizing plate PLP close to the illumination device ILD and the observer. On the other hand, the second polarizing plate from outside refers to the polarizing plate PLP2 of the dimming panel PNL1 and the polarizing plate PLP3 of the display panel PNL2.

More specifically, it is assumed that the extinction ratio P2 of the polarizing plate PLP2 of the dimming panel PNL1 is 3.1. The extinction ratios P1, P3 and P4 of the other polarizing plates PLP1, PLP3 and PLP4 are 4.5 (P2=3.1<P1=P3=P4=4.5). The transmittance of the polarizing plate PLP2 is 96%, and the transmittance of each of the other polarizing plates PLP1, PLP3 and PLP4 is 87%.

In the present embodiment, the extinction ratios P1, P3 and P4 of the polarizing plates PLP1, PLP3 and PLP4 are the same (P1=P3=P4). However, the present embodiment is not limited to this extinction ratio. The extinction ratios P1, P3 and P4 of the polarizing plates PLP1, PLP3 and PLP4 may be different from one another as long as they are larger than P2 of the polarizing plate PLP2.

Assume in FIG. 5 that the illumination light ILL emitted from the illumination device ILD contains 50% of the first polarized light POL1 and 50% of the second polarized light POL2. Symbol "%" is excluded from FIG. 5 in order to simplify the figure.

First, the illumination light ILL is transmitted through the polarizing plate PLP1. As shown in FIGS. 5 and 6, the transmittance of the polarizing plate PLP1 is 87%. The polarizing axis of the polarizing plate PLP1 is parallel to that of the first polarized light POL1. Thus, the percentage of the first polarized light POL1 transmitted through the polarizing plate PLP1 is 43.5% and the percentage of the second polarized light POL2 transmitted through the polarizing plate PLP1 is 0.0014%.

Then, the light transmitted through the polarizing plate PLP1 is transmitted through the liquid crystal panel LCD1. The transmittance of the liquid crystal panel LCD1 is 52% and the degree of depolarization thereof is 0.10%. Therefore, the percentage of the first polarized light POL1 transmitted through the liquid crystal panel LCD1 is 0.02% and the percentage of the second polarized light POL2 transmitted through the liquid crystal panel LCD1 is 22.61%.

As described above, the liquid crystal panel LCD1 is in an ON state. The light transmitted through the liquid crystal panel LCD1 enters the polarizing plate PLP2. The transmittance of the polarizing plate PLP2 is 96% as described above. Since the polarizing axes of the polarizing plates PLP2 and PLP1 are in a cross-Nicol relationship, the percentage of the first polarized light POL1 transmitted through the polarizing plate PLP2 is 0.00% and the percentage of the second polarized light POL2 transmitted through the polarizing plate PLP2 is 21.69%.

Then, the light transmitted through the polarizing plate PLP2, that is, the light transmitted through the dimming panel PNL1, is transmitted through the diffusion sheet DFS. Since the transmittance of the diffusion sheet DFS is 86%, the percentage of the first polarized light POL1 is 0.00% and that of the second polarized light POL2 is 18.65%.

The light transmitted through the diffusion sheet DFS enters the display panel PNL2. The transmittance of the polarizing plate PLP3 of the display panel PNL2 is 87%. The polarizing axes of the polarizing plates PLP3 and PLP2 are parallel to each other. Thus, the percentage of the first polarized light POL1 transmitted through the polarizing plate PLP3 is 0.00% and the percentage of the second polarized light POL2 transmitted through the polarizing plate PLP3 is 16.22%.

The transmittance of the liquid crystal panel LCD2 of the display panel PNL2 is 32% as shown in FIG. 6. The degree of depolarization of the liquid crystal panel LCD2 is 0.10%. Thus, the percentage of the first polarized light POL1 transmitted through the liquid crystal panel LCD2 is 5.19% and the percentage of the second polarized light POL2 transmitted through the liquid crystal panel LCD2 is 0.00%.

The light transmitted through the liquid crystal panel LCD2 enters the polarizing plate PLP4. The transmittance of the polarizing plate PLP4 is 87%. Since the polarizing axes of the polarizing plates PLP4 and PLP3 are in a cross-Nicol relationship, the percentage of the first polarized light POL1 transmitted through the polarizing plate PLP4 is 4.51% and the percentage of the second polarized light POL2 transmitted through the polarizing plate PLP4 is 0.00%. The luminance of the display device DSP is the sum of the first polarized light POL1 and the second polarized light POL2, that is, 4.51%.

Figure 7:
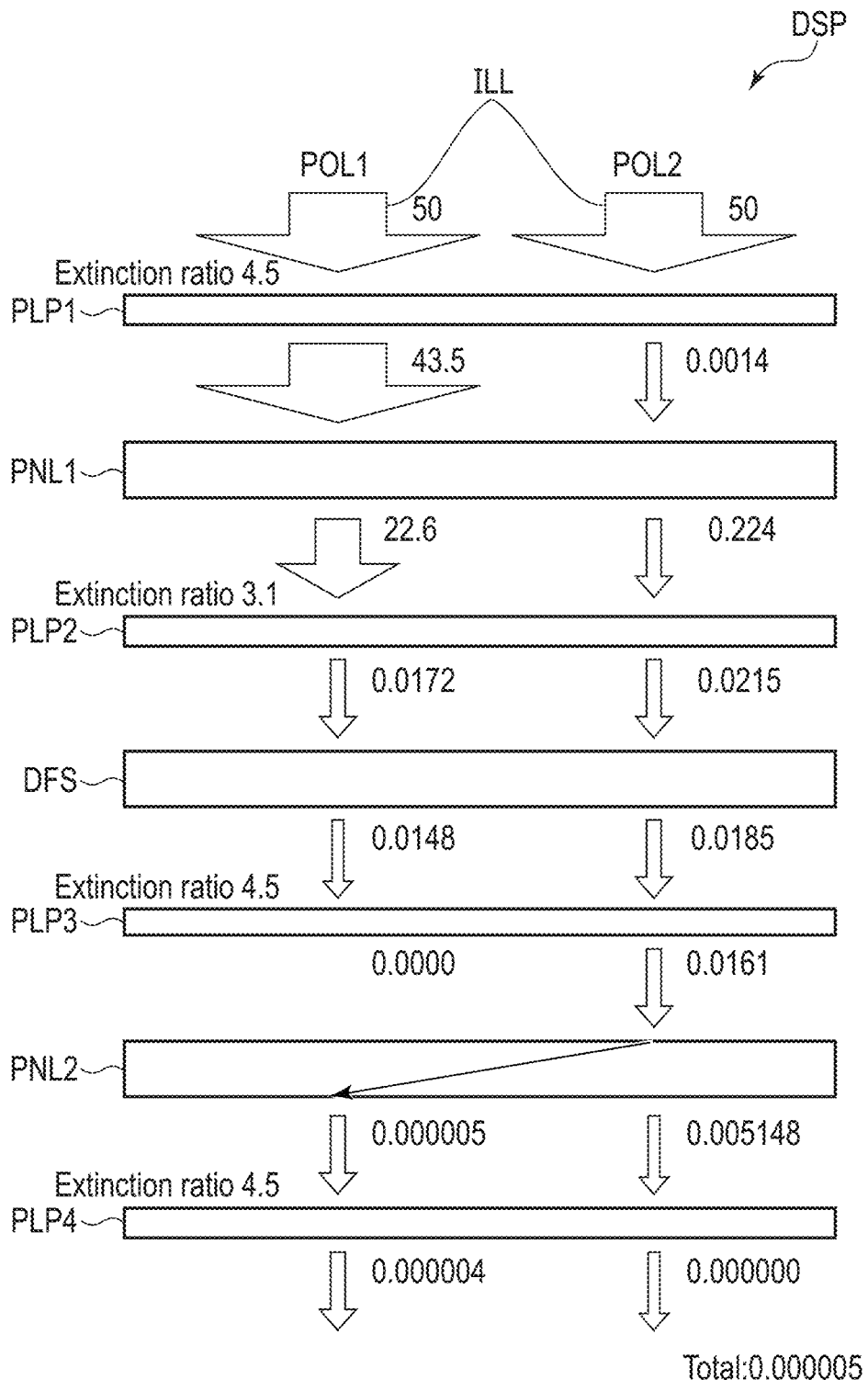
FIG. 7 is a schematic diagram showing a luminance transition and the like in the display device.

FIG. 7 is a schematic diagram showing a luminance transition and the like in the display device DSP. FIG. 7 shows a luminance transition when the dimming panel PNL1 of the display device DSP is in an OFF state. With reference to FIGS. 7 and 6, a description will be given of the luminance transition when the dimming panel PNL1 (liquid crystal panel LCD1) is in an OFF state.

First, the illumination light ILL is transmitted through the polarizing plate PLP1. As described above, the transmittance of the polarizing plate PLP1 is 87%. The polarizing axis of the polarizing plate PLP1 is parallel to that of the first polarized light POL1. Thus, the percentage of the first polarized light POL1 transmitted through the polarizing plate PLP1 is 43.5% and the percentage of the second polarized light POL2 transmitted through the polarizing plate PLP1 is 0.0014%.

Then, the light transmitted through the polarizing plate PLP1 is transmitted through the liquid crystal panel LCD1. The transmittance of the liquid crystal panel LCD1 is 52% and the degree of depolarization is 0.10%. Therefore, the percentage of the first polarized light POL1 transmitted through the liquid crystal panel LCD1 is 22.6% and the percentage of the second polarized light POL2 transmitted through the liquid crystal panel LCD1 is 0.224%.

As described above, the liquid crystal panel LCD1 is in an OFF state. The light transmitted through the liquid crystal panel LCD1 enters the polarizing plate PLP2. The transmittance of the polarizing plate PLP2 is 96% as described above. Since the polarizing axes of the polarizing plates PLP2 and PLP1 are in a cross-Nicol relationship, the percentage of the first polarized light POL1 transmitted through the polarizing plate PLP2 is 0.0172% and that of the second polarized light POL2 transmitted through the polarizing plate PLP2 is 0.0215%.

Then, the light transmitted through the polarizing plate PLP2, that is, the light transmitted through the dimming panel PNL1, is transmitted through the diffusion sheet DFS. Since the transmittance of the diffusion sheet DFS is 86%, the percentage of the first polarized light POL1 is 0.0148% and that of the second polarized light POL2 is 0.0185%.

The light transmitted through the diffusion sheet DFS enters the display panel PNL2. The transmittance of the polarizing plate PLP3 of the display panel PNL2 is 87%. The polarizing axes of the polarizing plates PLP3 and PLP2 are parallel to each other. Thus, the percentage of the first polarized light POL1 transmitted through the polarizing plate PLP3 is 0.0000% and that of the second polarized light POL2 transmitted through the polarizing plate PLP3 is 0.0161%.

The display panel PNL2 is in an OFF state as described above. The transmittance of the liquid crystal panel LCD2 of the display panel PNL2 is 32% as shown in FIG. 6. The degree of depolarization of the liquid crystal panel LCD2 is 0.10%. Therefore, the percentage of the first polarized light POL1 transmitted through the liquid crystal panel LCD2 is 0.000005% and the percentage of the second polarized light POL2 transmitted through the liquid crystal panel LCD2 is 0.005148%.

The light transmitted through the liquid crystal panel LCD2 enters the polarizing plate PLP4. The transmittance of the polarizing plate PLP4 is 87%. Since the polarizing axes of the polarizing plates PLP4 and PLP3 are in a cross-Nicol relationship, the percentage of the first polarized light POL1 transmitted through the polarizing plate PLP2 is 0.000004% and that of the second polarized light POL2 is 0.000000%.

The luminance of the display device DSP is the sum of the first polarized light POL1 and the second polarized light POL2, that is, 0.000005%.

As described above, as shown in FIGS. 5 and 6, the transmittance of the display device DSP is 4.51% when the dimming panel PNL1 is in an ON state. As shown in FIGS. 7 and 6, the transmittance of the display device DSP is 0.000005% when the dimming panel PNL1 is in an OFF state. Since the contrast ratio of the display device DSP is the ratio of the transmittance in the ON state to the transmittance in the OFF state as described above, it is 4.51:0.000005=989,839:1.

As described above, although the contrast of the display device DSP shown in FIGS. 5 through 7 is lower than that of the display device DSP shown in FIGS. 3 and 4, the former display device DSP can display a high-contrast image. In addition, the luminance of the display device DSP shown in FIGS. 5 through 7 is higher than that of the display device DSP shown in FIGS. 3 and 4. In the present embodiment, therefore, a display device DSP which achieves both high contrast and high luminance and which increases in its display quality can be obtained.

Configuration Example 1

Figure 8:
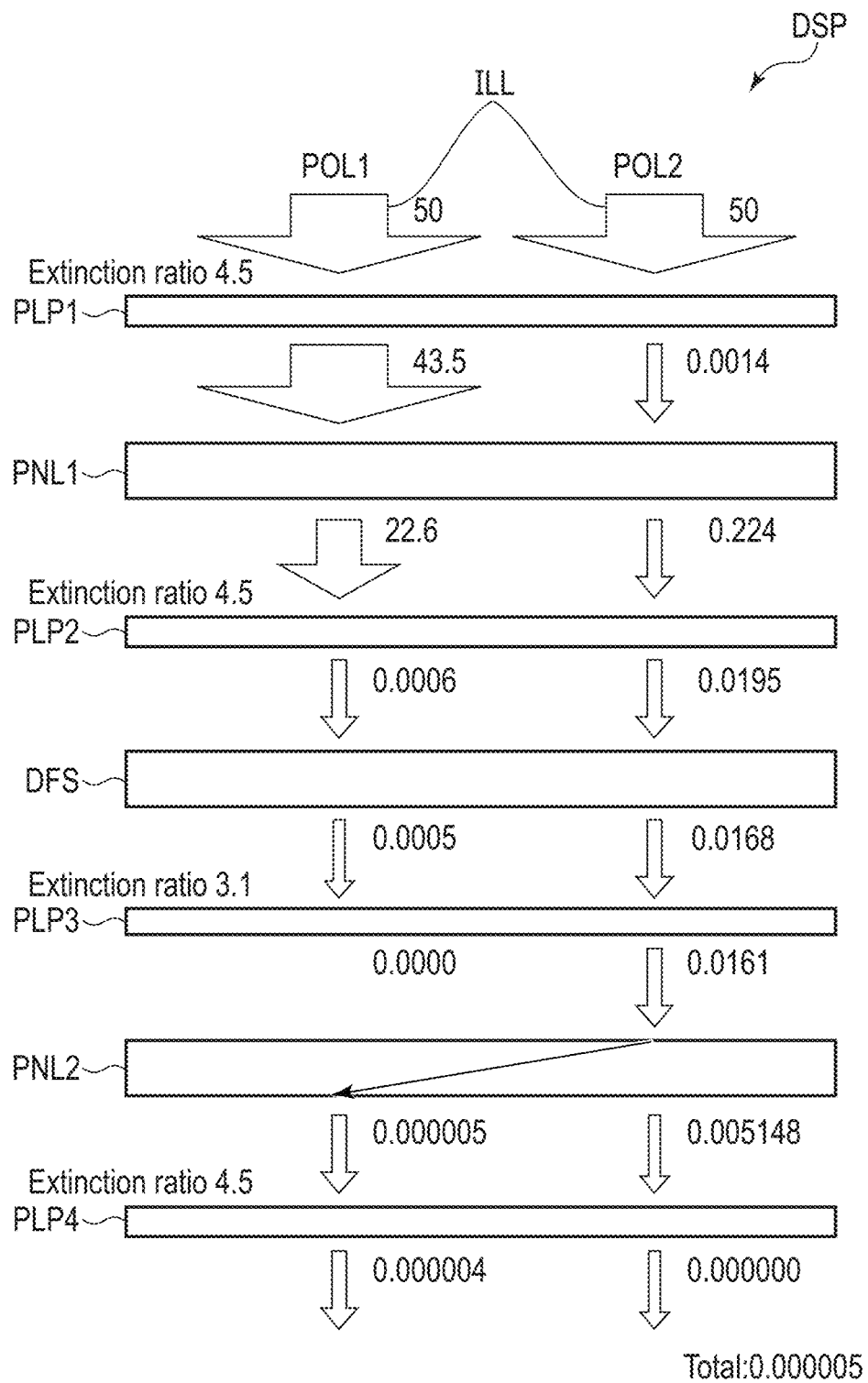
FIG. 8 is a diagram showing another example of the configuration of the display device according to a present embodiment.

FIG. 8 is a diagram showing another example of the configuration of the display device according to the present embodiment. The configuration example shown in FIG. 8 differs from that shown in FIG. 7 in that the extinction ratio of the polarizing plate on the display panel side is decreased.

Note that FIG. 8 shows a luminance transition when the dimming panel PNL1 of the display device DSP is in an OFF state. FIG. 9 is a table showing transmittance of each component, extinction ratio of the polarizing plate (polarizing plates PLP1, PLP2, PLP3, PLP4), and a degree of depolarization of the liquid crystal panels LCD1 and LCD2.

Assume in the display device DSP shown in FIG. 8 that the extinction ratio P3 of the polarizing plate PLP3 of the display panel PNL2 is 3.1. The extinction ratios P1, P2 and P4 of the other polarizing plates PLP1, PLP2 and PLP4 are each 4.5 (P3=3.1<P1=P2=P4=4.5). The transmittance of the polarizing plate PLP3 is 96%, and the transmittance of each of the other polarizing plates PLP1, PLP2 and PLP4 is 87%.

In this configuration example, the extinction ratios P1, P2 and P4 of the polarizing plates PLP1, PLP2 and PLP4 are the same (P1=P2=P4). However, the present embodiment is not limited to this extinction ratio. The extinction ratios P1, P2 and P4 of the polarizing plates PLP1, PLP2 and PLP4 may be different from one another if they are larger than P3 of the polarizing plate PLP3.

Assume in FIG. 8 that the illumination light ILL emitted from the illumination device ILD contains 50% of the first polarized light POL1 and 50% of the second polarized light POL2. Symbol "%" is excluded from FIG. 8 in order to simplify the figure.

First, the illumination light ILL is transmitted through the polarizing plate PLP1. As shown in FIGS. 8 and 9, the transmittance of the polarizing plate PLP1 is 87%. The polarizing axis of the polarizing plate PLP1 is parallel to that of the first polarized light POL1. Thus, the percentage of the first polarized light POL1 transmitted through the polarizing plate PLP1 is 43.5% and the percentage of the second polarized light POL2 transmitted through the polarizing plate PLP1 is 0.0014%.

Then, the light transmitted through the polarizing plate PLP1 is transmitted through the liquid crystal panel LCD1. The transmittance of the liquid crystal panel LCD1 is 52% and the degree of depolarization thereof is 0.10%. Therefore, the percentage of the first polarized light POL1 transmitted through the liquid crystal panel LCD1 is 22.6% and the percentage of the second polarized light POL2 transmitted through the liquid crystal panel LCD1 is 0.0224%.

As described above, the liquid crystal panel LCD1 is in an OFF state. The light transmitted through the liquid crystal panel LCD1 enters the polarizing plate PLP2. The transmittance of the polarizing plate PLP2 is 87% as described above. Since the polarizing axes of the polarizing plates PLP2 and PLP1 are in a cross-Nicol relationship, the percentage of the first polarized light POL1 transmitted through the polarizing plate PLP2 is 0.0006% and the percentage of the second polarized light POL2 transmitted through the polarizing plate PLP2 is 0.0195%.

Then, the light transmitted through the polarizing plate PLP2, that is, the light transmitted through the dimming panel PNL1, is transmitted through the diffusion sheet DFS. Since the transmittance of the diffusion sheet DFS is 86%, the percentage of the first polarized light POL1 is 0.0005% and that of the second polarized light POL2 is 0.168%.

The light transmitted through the diffusion sheet DFS enters the display panel PNL2. The transmittance of the polarizing plate PLP3 of the display panel PNL2 is 96%. The polarizing axes of the polarizing plates PLP3 and PLP2 are parallel to each other. Thus, the percentage of the first polarized light POL1 transmitted through the polarizing plate PLP3 is 0.0000% and the percentage of the second polarized light POL2 transmitted through the polarizing plate PLP3 is 0.161%.

The transmittance of the liquid crystal panel LCD2 of the display panel PNL2 is 32% as shown in FIG. 9. The degree of depolarization of the liquid crystal panel LCD2 is 0.10%. Thus, the percentage of the first polarized light POL1 transmitted through the liquid crystal panel LCD2 is 0.000005% and the percentage of the second polarized light POL2 transmitted through the liquid crystal panel LCD2 is 0.005%.

The light transmitted through the liquid crystal panel LCD2 enters the polarizing plate PLP4. The transmittance of the polarizing plate PLP4 is 87%. Since the polarizing axes of the polarizing plates PLP4 and PLP3 are in a cross-Nicol relationship, the percentage of the first polarized light POL1 transmitted through the polarizing plate PLP4 is 0.000004% and the percentage of the second polarized light POL2 transmitted through the polarizing plate PLP4 is 0.000000%. The luminance of the display device DSP is the sum of the first polarized light POL1 and the second polarized light POL2, that is, 0.0000005%.

Similarly, the transmittance of the dimming panel PNL1 in its ON state is obtained as 4.51. Since the contrast ratio of the display device DSP is the ratio of the transmittance in the ON state to the transmittance in the OFF state, it is 4.51:0.000005=989,839:1.

The display device DSP shown in FIGS. 8 and 9 also provides contrast and transmittance that are equivalent to those of the display device DSP shown in FIGS. 5 to 7. It is thus evident that the polarizing plate PLP located second from the outside and having a low extinction ratio may be the display panel PNL2 as well as the dimming panel PNL1.

The same advantages as those of the embodiment can also be obtained from the present configuration example.

Comparative Example

The comparative example is directed to an example in which of four polarizing plates PLP of the display device DSP, a polarizing plate PLP having a low extinction ratio is located outside.

Figure 10:
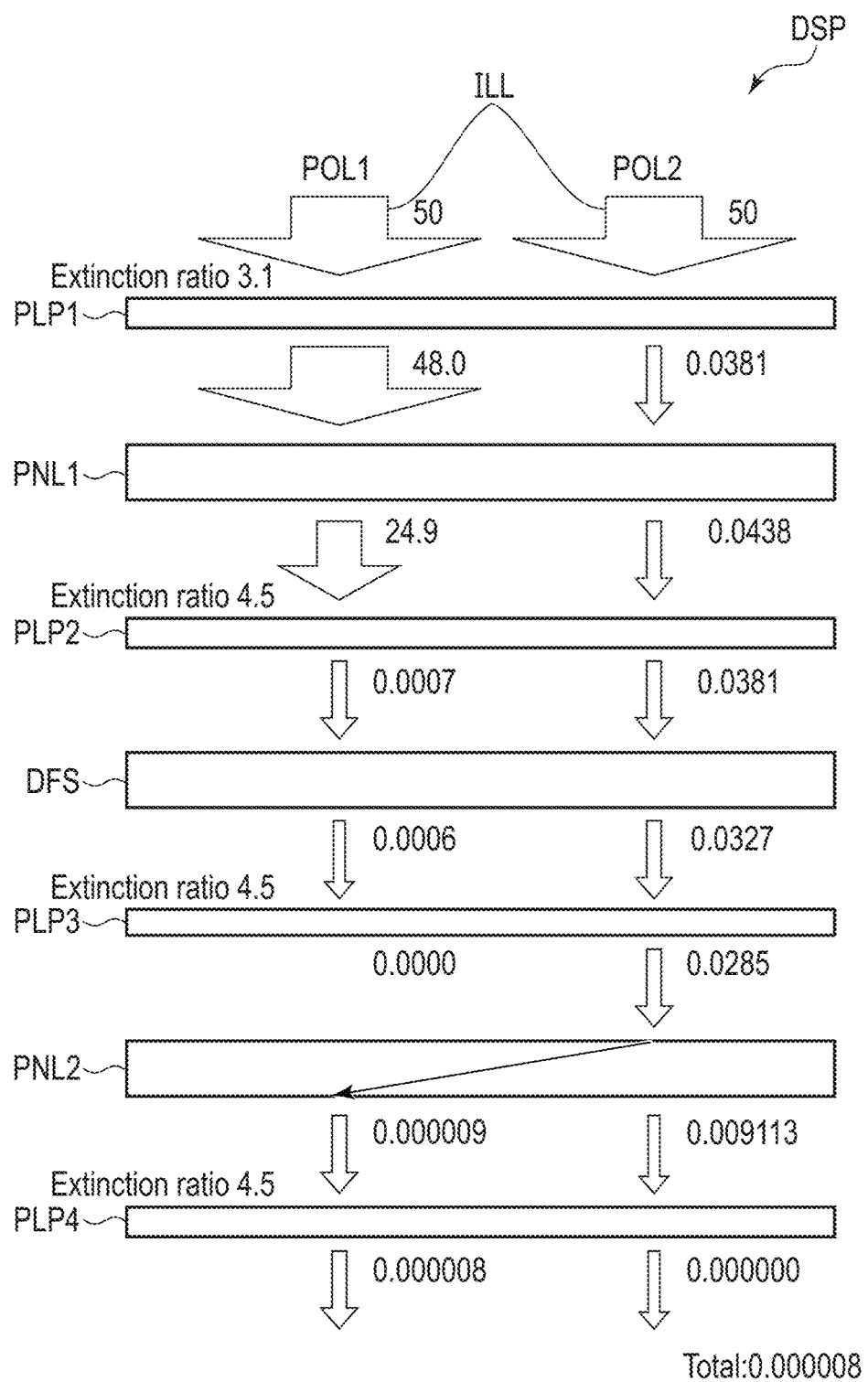
FIG. 10 is a diagram showing an example of a configuration of a display device in a comparative example.

FIG. 10 is a diagram showing an example of a configuration of the display device in the comparative example. The example shown in FIG. 10 differs from the configuration example shown in FIG. 7 in that the outermost polarizing plate of the four polarizing plates PLP is decreased in its extinction ratio. FIG. 10 also shows a luminance transition when the dimming panel PNL1 of the display device DSP is in an OFF state.

FIG. 11 is a table showing transmittance of each component, extinction ratio of the polarizing plate (polarizing plates PLP1, PLP2, PLP3, PLP4), and a degree of depolarization of the liquid crystal panels LCD1 and LCD2.

In FIGS. 10 and 11, it is assumed that the extinction ratio P1 of the polarizing plate PLP1 of the dimming panel PNL1 is 3.1. The extinction ratios P2, P3 and P4 of the other polarizing plates PLP2, PLP3 and PLP4 are each 4.5 (P1=3.1<P2=P3=P4=4.5). It is also assumed that the transmittance of the polarizing plate PLP1 is 96%, and the transmittance of each of the other polarizing plates PLP2, PLP3 and PLP4 is 87%.

Assume in FIG. 10 that the illumination light ILL emitted from the illumination device ILD contains 50% of the first polarized light POL1 and 50% of the second polarized light POL2. Symbol "%" is excluded from FIG. 10 in order to simplify the figure.

First, the illumination light ILL is transmitted through the polarizing plate PLP1. As shown in FIGS. 10 and 11, the transmittance of the polarizing plate PLP1 is 96%. The polarizing axis of the polarizing plate PLP1 is parallel to that of the first polarized light POL1. Thus, the percentage of the first polarized light POL1 transmitted through the polarizing plate PLP1 is 48.0% and the percentage of the second polarized light POL2 transmitted through the polarizing plate PLP1 is 0.04%.

Then, the light transmitted through the polarizing plate PLP1 is transmitted through the liquid crystal panel LCD1. The transmittance of the liquid crystal panel LCD1 is 52% and the degree of depolarization thereof is 0.10%. Therefore, the percentage of the first polarized light POL1 transmitted through the liquid crystal panel LCD1 is 24.9% and the percentage of the second polarized light POL2 transmitted through the liquid crystal panel LCD1 is 0.0438%.

As described above, the liquid crystal panel LCD1 is in an OFF state. The light transmitted through the liquid crystal panel LCD1 enters the polarizing plate PLP2. The transmittance of the polarizing plate PLP2 is 87% as described above. Since the polarizing axes of the polarizing plates PLP2 and PLP1 are in a cross-Nicol relationship, the percentage of the first polarized light POL1 transmitted through the polarizing plate PLP2 is 0.0007% and the percentage of the second polarized light POL2 transmitted through the polarizing plate PLP2 is 0.0381%.

Then, the light transmitted through the polarizing plate PLP2, that is, the light transmitted through the dimming panel PNL1, is transmitted through the diffusion sheet DFS. Since the transmittance of the diffusion sheet DFS is 86%, the percentage of the first polarized light POL1 is 0.0006% and that of the second polarized light POL2 is 0.0327%.

The light transmitted through the diffusion sheet DFS enters the display panel PNL2. The transmittance of the polarizing plate PLP3 of the display panel PNL2 is 87%. The polarizing axes of the polarizing plates PLP3 and PLP2 are parallel to each other. Thus, the percentage of the first polarized light POL1 transmitted through the polarizing plate PLP3 is 0.0000% and the percentage of the second polarized light POL2 transmitted through the polarizing plate PLP3 is 0.0285%.

The transmittance of the liquid crystal panel LCD2 of the display panel PNL2 is 32% as shown in FIG. 9. The degree of depolarization of the liquid crystal panel LCD2 is 0.10%. Thus, the percentage of the first polarized light POL1 transmitted through the liquid crystal panel LCD2 is 0.000009% and the percentage of the second polarized light POL2 transmitted through the liquid crystal panel LCD2 is 0.009104%.

The light transmitted through the liquid crystal panel LCD2 enters the polarizing plate PLP4. The transmittance of the polarizing plate PLP4 is 87%. Since the polarizing axes of the polarizing plates PLP4 and PLP3 are in a cross-Nicol relationship, the percentage of the first polarized light POL1 transmitted through the polarizing plate PLP4 is 0.000008% and the percentage of the second polarized light POL2 transmitted through the polarizing plate PLP4 is 0.000000%. The luminance of the display device DSP is the sum of the first polarized light POL1 and the second polarized light POL2, that is, 0.000008%.

Similarly, the transmittance of the dimming panel PNL1 in its ON state is obtained as 4.51. Since the contrast ratio of the display device DSP is the ratio of the transmittance in the ON state to the transmittance in the OFF state, it is 4.51:0.000008=573,669:1.

The contrast of the display device DSP shown in FIGS. 10 and 11 is made lower than that of the display device DSP shown in FIGS. 5 to 7. It is therefore evident that the display device DSP of the foregoing embodiment can be increased in its display quality.

The reason why the display device DSP shown in FIGS. 10 and 11 differs in contrast from the display device DSP shown in FIGS. 5 to 7 is estimated as follows. That is, if the light transmitted through the polarizing plate PLP2 shown in FIG. 5 and the light transmitted through the polarizing plate PLP2 shown in FIG. 10 are compared, the sum of the first polarized light POL1 and the second polarized light POL2 are the same (0.0387%) in both the display devices DSP shown in FIGS. 5 and 10. However, the display devices DSP shown in FIGS. 5 and 10 are different in the ratio of the first polarized light POL1 and the second polarized POL2.

If, in FIGS. 5 and 10, the light transmitted through the polarizing plate PLP2 and the diffusion sheet DFS is transmitted through the polarizing plate PLP3, the percentage of the light is 0.0161% in FIG. 5, and it is 0.0285% in FIG. 10; thus, the amount of light in FIG. 10 is larger than that of light in FIG. 5. The amount of light transmitted and emitted through all of the polarizing plates PLP of the display device DSP is larger in FIG. 10 than in FIG. 5. In FIG. 10, black is not clear. Therefore, the contrast of the display device DSP shown in FIG. 10 is lower.

Figure 12:
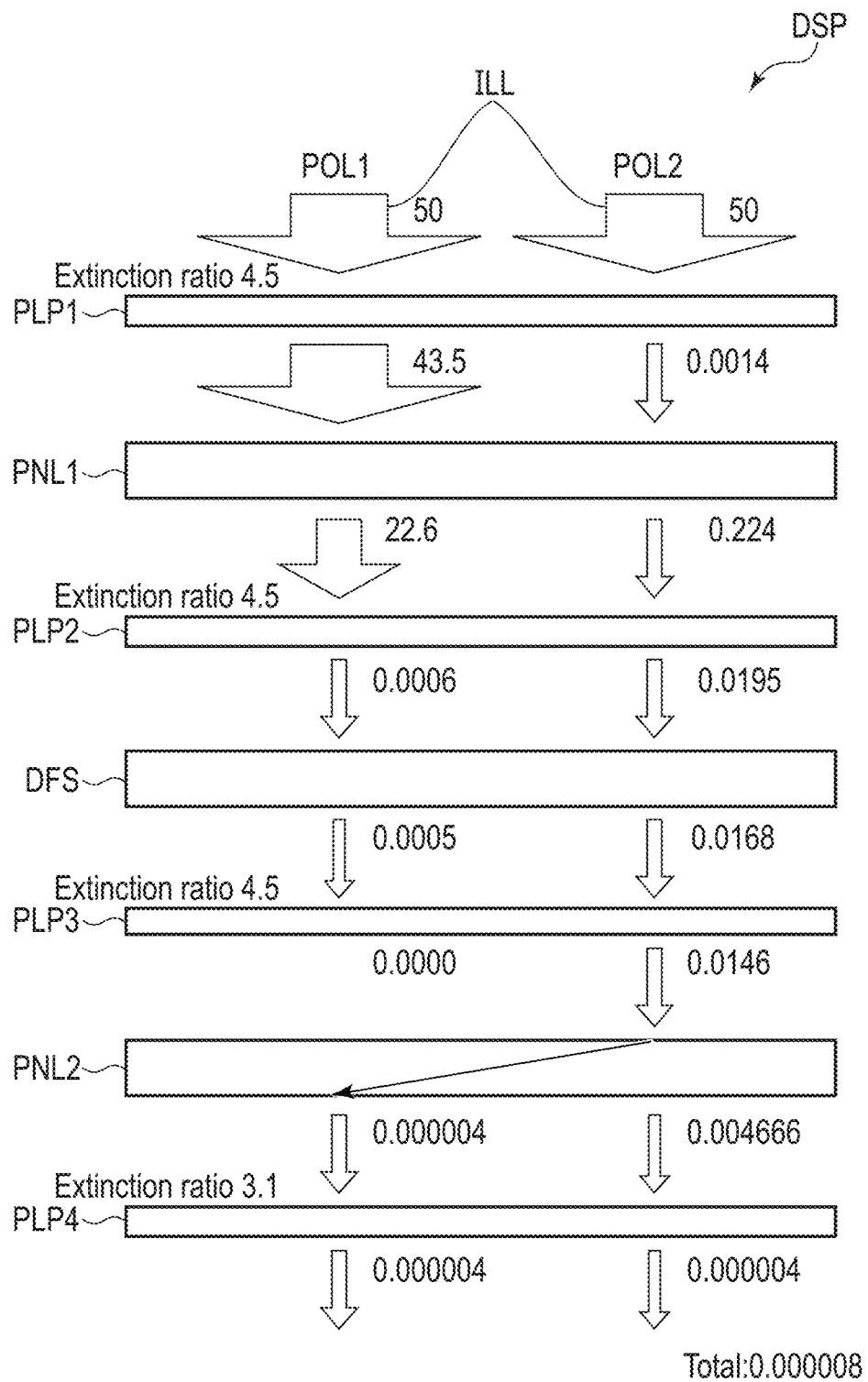
FIG. 12 is a diagram showing another example of the configuration of the display device in the comparative example.

FIG. 12 is a diagram showing another example of the configuration of the display device according to the comparative example. The configuration example shown in FIG. 12 differs from that shown in FIG. 10 in that the extinction ratio of the polarizing plate PLP4 of the display panel PNL2 is decreased. FIG. 12 shows a transition of luminance of the display device DSP when the dimming panel PNL1 is in an OFF state.

FIG. 13 is a table showing transmittance of each component, extinction ratio of the polarizing plate (polarizing plates PLP1, PLP2, PLP3, PLP4), and a degree of depolarization of the liquid crystal panels LCD1 and LCD2.

In FIGS. 12 and 13, it is assumed that the extinction ratio P4 of the polarizing plate PLP4 of the dimming panel PNL2 is 3.1. The extinction ratios P1, P2 and P3 of the other polarizing plates PLP1, PLP2 and PLP3 are each 4.5 (P4=3.1<P1=P2=P3=4.5). It is also assumed that the transmittance of the polarizing plate PLP4 is 96%, and the transmittance of each of the other polarizing plates PLP1, PLP2 and PLP3 is 87%.

First, the illumination light ILL is transmitted through the polarizing plate PLP1. As described above, the transmittance of the polarizing plate PLP1 is 87%. The polarizing axis of the polarizing plate PLP1 is parallel to that of the first polarized light POL1. Thus, the percentage of the first polarized light POL1 transmitted through the polarizing plate PLP1 is 43.5% and the percentage of the second polarized light POL2 transmitted through the polarizing plate PLP1 is 0.0014%.

Then, the light transmitted through the polarizing plate PLP1 is transmitted through the liquid crystal panel LCD1. The transmittance of the liquid crystal panel LCD1 is 52% and the degree of depolarization thereof is 0.10%. Therefore, the percentage of the first polarized light POL1 transmitted through the liquid crystal panel LCD1 is 22.6% and the percentage of the second polarized light POL2 transmitted through the liquid crystal panel LCD1 is 0.224%.

As described above, the liquid crystal panel LCD1 is in an OFF state. The light transmitted through the liquid crystal panel LCD1 enters the polarizing plate PLP2. The transmittance of the polarizing plate PLP2 is 87% as described above. Since the polarizing axes of the polarizing plates PLP2 and PLP1 are in a cross-Nicol relationship, the percentage of the first polarized light POL1 transmitted through the polarizing plate PLP2 is 0.0006% and the percentage of the second polarized light POL2 transmitted through the polarizing plate PLP2 is 0.0195%.

Then, the light transmitted through the polarizing plate PLP2, that is, the light transmitted through the dimming panel PNL1, is transmitted through the diffusion sheet DFS. Since the transmittance of the diffusion sheet DFS is 86%, the percentage of the first polarized light POL1 is 0.0005% and that of the second polarized light POL2 is 0.0168%.

The light transmitted through the diffusion sheet DFS enters the display panel PNL2. The transmittance of the polarizing plate PLP3 of the display panel PNL2 is 87%. The polarizing axes of the polarizing plates PLP3 and PLP2 are parallel to each other. Thus, the percentage of the first polarized light POL1 transmitted through the polarizing plate PLP3 is 0.0000% and the percentage of the second polarized light POL2 transmitted through the polarizing plate PLP3 is 0.0146%.

The display panel PNL2 is in an OFF state as described above. The transmittance of the liquid crystal panel LCD2 of the display panel PNL2 is 32% as shown in FIG. 6. The degree of depolarization of the liquid crystal panel LCD2 is 0.10%. Thus, the percentage of the first polarized light POL1 transmitted through the liquid crystal panel LCD2 is 0.000004% and the percentage of the second polarized light POL2 transmitted through the liquid crystal panel LCD2 is 0.004666%.

The light transmitted through the liquid crystal panel LCD2 enters the polarizing plate PLP4. The transmittance of the polarizing plate PLP4 is 96% as described above. Since the polarizing axes of the polarizing plates PLP4 and PLP3 are in a cross-Nicol relationship, the percentage of the first polarized light POL1 transmitted through the polarizing plate PLP2 is 0.000004% and the percentage of the second polarized light POL2 transmitted through the polarizing plate PLP2 is 0.000004%. The luminance of the display device DSP is the sum of the first polarized light POL1 and the second polarized light POL2, that is, 0.000008%.

Similarly, the transmittance of the dimming panel PNL1 in its ON state is obtained as 4.51. Since the contrast ratio of the display device DSP is the ratio of the transmittance in the ON state to the transmittance in the OFF state, it is 4.51:0.000008=573,669:1.

The contrast of the display device DSP shown in FIGS. 12 and 13 is made lower than that of the display device DSP shown in FIGS. 8 and 9. It is therefore evident that the display device DSP according to the embodiment shown in FIGS. 5 to 7 or FIGS. 8 and 9 can be increased in its display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising an illumination device, a first panel, and a second panel, which are stacked in sequence, wherein:

the first panel includes a first polarizing plate, a second polarizing plate, and a first liquid crystal panel interposed between the first polarizing plate and the second polarizing plate;

the second panel includes a third polarizing plate, a fourth polarizing plate, and a second liquid crystal panel interposed between the third polarizing plate and the fourth polarizing plate;

among the first polarizing plate to the fourth polarizing plate, a polarizing plate, which is located second from a surface closest to the illumination device or a surface closest to an observer, has an extinction ratio that is lower than that of each of the other polarizing plates; and the second polarizing plate has transmittance that is higher than that of each of the first polarizing plate, the third polarizing plate and the fourth polarizing plate, or the third polarizing plate has transmittance that is higher than that of each of the first polarizing plate, the second polarizing plate and the fourth polarizing plate.

2. The display device according to claim 1, wherein the second panel includes a color filter.

3. The display device according to claim 1, wherein the second polarizing plate has a polarizing axis that is parallel to a polarizing axis of the third polarizing plate.

4. The display device according to claim 1, wherein the extinction ratios of the other polarizing plates are same.

* * * * *